United States Patent [19]
Kluge

[11] 3,761,886
[45] Sept. 25, 1973

[54] CONTENT ADDRESSABLE DISCRETE DOMAIN MASS MEMORY

[75] Inventor: Werner Erich Kluge, Kanata, Ontario, Canada

[73] Assignee: Bell Canada-Northern Electric Research Limited, Ottawa, Ontario, Canada

[22] Filed: Dec. 7, 1972

[21] Appl. No.: 313,097

[52] U.S. Cl. .......................... 340/172.5, 340/174 TF
[51] Int. Cl. .......................... H01f 10/00, G11b 5/00
[58] Field of Search .................... 340/172.5, 174 TF

[56] References Cited

UNITED STATES PATENTS 3,541,522 11/1970 Bobeck et al. .................. 340/172.5

*Primary Examiner*—Raulfe B. Zache
*Attorney*—John E. Mowle

[57] ABSTRACT

A magnetic bubble mass memory which combines a plurality of storage loops with bubble logic to provide direct interrogation and manipulation of the stored information, without the requirement for external read and write access facilities associated with each loop. With random access, the memory can provide continuous output of the data information.

4 Claims, 3 Drawing Figures

LOGIC CIRCUIT OPERATIONS (BINARY NOTATION)

| PATH | WORD 1 | | | | | | | | | | | |
|---|---|---|---|---|---|---|---|---|---|---|---|---|
| | ADDRESS | | | | INFORMATION | | | | | | | R |
| D | 1 | 1 | 0 | 1 | 0 | 0 | 0 | 0 | 0 | 0 | 0 | 0 |
| S | 1 | 1 | 0 | 1 | 0 | 1 | 0 | 1 | 1 | 0 | 0 | 0 |
| A | 1 | 1 | 1 | 1 | 0 | 0 | 0 | 0 | 0 | 0 | 0 | 0 |
| C | 0 | 0 | 0 | 0 | 1 | 1 | 1 | 1 | 1 | 1 | 1 | 0 |
| R | 0 | 0 | 0 | 0 | 0 | 0 | 0 | 0 | 0 | 0 | 0 | 1 |
| D' | 1 | 1 | 0 | 1 | 0 | 1 | 0 | 1 | 1 | 0 | 0 | 0 |
| S' | 1 | 1 | 0 | 1 | 0 | 1 | 0 | 1 | 1 | 0 | 0 | 0 |
| C' | 0 | 0 | 0 | 0 | 0 | 0 | 0 | 0 | 0 | 0 | 0 | 0 |
| C'' | 0 | 0 | 0 | 0 | 1 | 1 | 1 | 1 | 1 | 1 | 1 | 0 |
| BIT | 1 | 2 | 3 | 4 | 5 | 6 | 7 | 8 | 9 | 10 | 11 | 12 |

| PATH | WORD 2 | | | | | | | | | | | |
|---|---|---|---|---|---|---|---|---|---|---|---|---|
| | ADDRESS | | | | INFORMATION | | | | | | | R |
| D | 0 | 0 | 1 | 0 | 1 | 1 | 1 | 1 | 0 | 0 | 0 | 0 |
| S | 1 | 1 | 0 | 1 | 0 | 1 | 0 | 1 | 1 | 0 | 0 | 0 |
| A | 1 | 1 | 1 | 1 | 0 | 0 | 0 | 0 | 0 | 0 | 0 | 0 |
| C | 0 | 0 | 0 | 0 | 1 | 1 | 1 | 1 | 1 | 1 | 1 | 0 |
| R | 0 | 0 | 0 | 0 | 0 | 0 | 0 | 0 | 0 | 0 | 0 | 0 |
| D' | 0 | 0 | 1 | 0 | 1 | 1 | 1 | 1 | 0 | 0 | 0 | 0 |
| S' | 1 | 1 | 0 | 1 | 1 | 0 | 1 | 0 | 1 | 0 | 0 | 0 |
| C' | 0 | 0 | 0 | 0 | 1 | 1 | 1 | 1 | 1 | 1 | 1 | 0 |
| C'' | 0 | 0 | 0 | 0 | 0 | 0 | 0 | 0 | 0 | 0 | 0 | 0 |
| BIT | 1 | 2 | 3 | 4 | 5 | 6 | 7 | 8 | 9 | 10 | 11 | 12 |

| PATH | WORD 3 | | | | | | | | | | | |
|---|---|---|---|---|---|---|---|---|---|---|---|---|
| | ADDRESS | | | | INFORMATION | | | | | | | R |
| D | 1 | 0 | 1 | 0 | 0 | 1 | 0 | 1 | 1 | 0 | 0 | 0 |
| S | 1 | 1 | 0 | 1 | 0 | 1 | 0 | 1 | 1 | 0 | 0 | 0 |
| A | 0 | 0 | 0 | 0 | 0 | 0 | 0 | 0 | 0 | 0 | 0 | 0 |
| C | 1 | 1 | 1 | 1 | 1 | 1 | 1 | 1 | 1 | 1 | 1 | 0 |
| R | 0 | 0 | 0 | 0 | 0 | 0 | 0 | 0 | 0 | 0 | 0 | 1 |
| D' | 1 | 0 | 1 | 0 | 0 | 1 | 0 | 1 | 1 | 0 | 0 | 0 |
| S' | 0 | 1 | 1 | 1 | 0 | 0 | 0 | 0 | 0 | 0 | 0 | 0 |
| C' | 1 | 1 | 1 | 1 | 1 | 1 | 1 | 1 | 1 | 1 | 1 | 0 |
| C'' | 0 | 0 | 0 | 0 | 0 | 0 | 0 | 0 | 0 | 0 | 0 | 0 |
| BIT | 1 | 2 | 3 | 4 | 5 | 6 | 7 | 8 | 9 | 10 | 11 | 12 |

CONTENT ADDRESSABLE DISCRETE DOMAIN MASS MEMORY

This invention relates to a content addressable mass information storage and retrieval arrangement, and more particularly to one in which the associated logic functions are performed directly in the storage medium thereby eliminating a need for ancillary electronic logic.

BACKGROUND OF THE INVENTION

In the field of data processing, various forms of sequential memories such as disc files and magnetic tapes are widely known and used. While such memories provide high storage capacity, they suffer from the disadvantage that no logic functions can be performed directly in them. Consequently, in order to manipulate information stored in a disc file or on tape, it must first be read into an electronic processing unit, acted upon and then reinserted back into the memory.

Discrete domain arrangements are particularly adaptable to sequential memory systems due to their potentially low cost, high reliability, small power consumption and high storage density. Such discrete domains include magnetic bubbles such as described in an article by Andrew H. Bobeck and H.E.D. Scoville entitled: "Magnetic Bubbles", , Scientific American, June 1971, Vol.224, pp. 88 to 90. This article describes several structures for manipulating and controlling the transmission of magnetic bubbles along discrete paths or tracks, and includes an explanation of one form of bubble mass-memory.

In addition to information storage and retrieval in such discrete domain arrangements various logic functions can be performed by direct manipulation of bubbles. Three articles which describe such logic circuitry are: "Resident-Bubble Cellular Logic Using Magnetic Domains" by M.R. Garey, IEEE Transactions on Computers, April 1972, pp 392–396; "Applications of Bubble Devices" by P. I. Bonyhard et al, IEEE Transactions on Magnetics, Vol. MAG–6 No. 3, September 1970, pp 447–451; and "Logic Functions for Magnetic Bubble Devices" by Robert M. Sandfort and Edward R. Burke, IEEE Transactions on Magnetics, September 1971, pp 358–360.

In mass memory systems such as the one described in the article by Bobeck et al, data information, stored in the minor loops, is first circulated until the desired word reaches the transfer points. On command of a transfer signal, the information is transferred to a major loop whereupon it can be simply read out, or erased and overwritten. It is then further advanced along the major loop and transferred back into the minor loops. With such an arrangement, only one word can be manipulated at any one time. Also, with a random access memory of this type, considerable time is lost in advancing the information from and to the transfer points. With large capacity storage systems this can greatly curtail the operating speed of the memory.

SUMMARY OF THE INVENTION

The present invention overcomes this access delay problem by combining an iterative array of memory loops with logic circuitry to provide an alterable nonvolatile memory system.

Thus, in accordance with the present invention there is provided a discrete domain memory arrangement comprising a plurality of closed propagation loops for sequentially circulating and storing a data word having a unique address and a information portion. The memory also includes at least one interrogation path for sequentially propagating data requests therealong which have address and information portions coextensive with those contained in the loops. Also included in the interrogation path is a means for generating a specific address stored in the propagation loops. Associated with each loop is a means for sequentially and directly comparing on a bit by bit basis the address within each loop to the specific address. The memory also comprises a means responsive to the identification of a match between addresses in the comparing means for replicating the information contained in the associated loop in the information portion of the word in the interrogation path. Consequently, sequential interrogation of a number of the loops results in the data words being continuously fed out from the interrogation path in the order requested.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
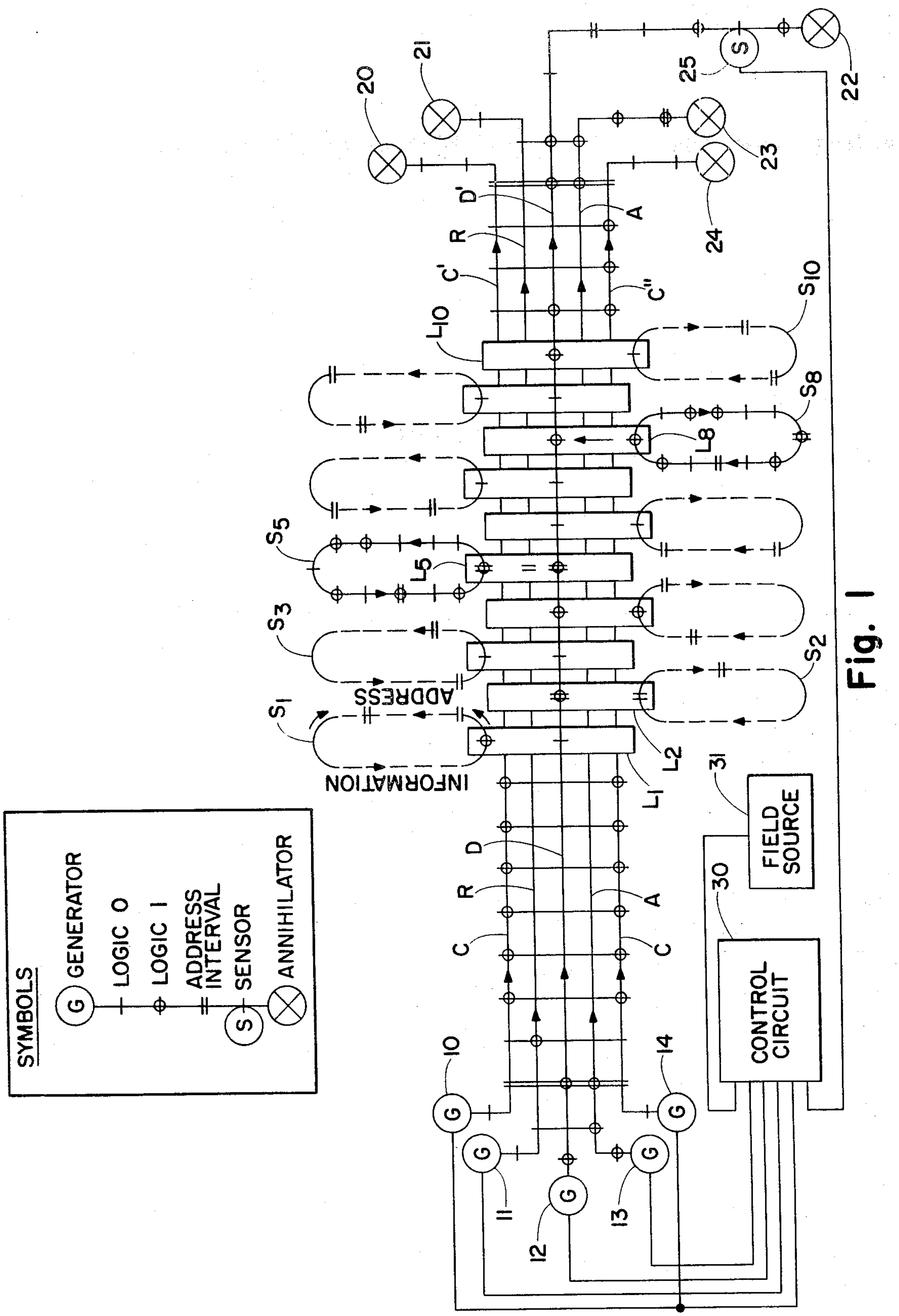
FIG. 1 is a pictorial schematic diagram of a content addressable discrete domain memory arrangement in accordance with the present invention.
Figures 2, 3:
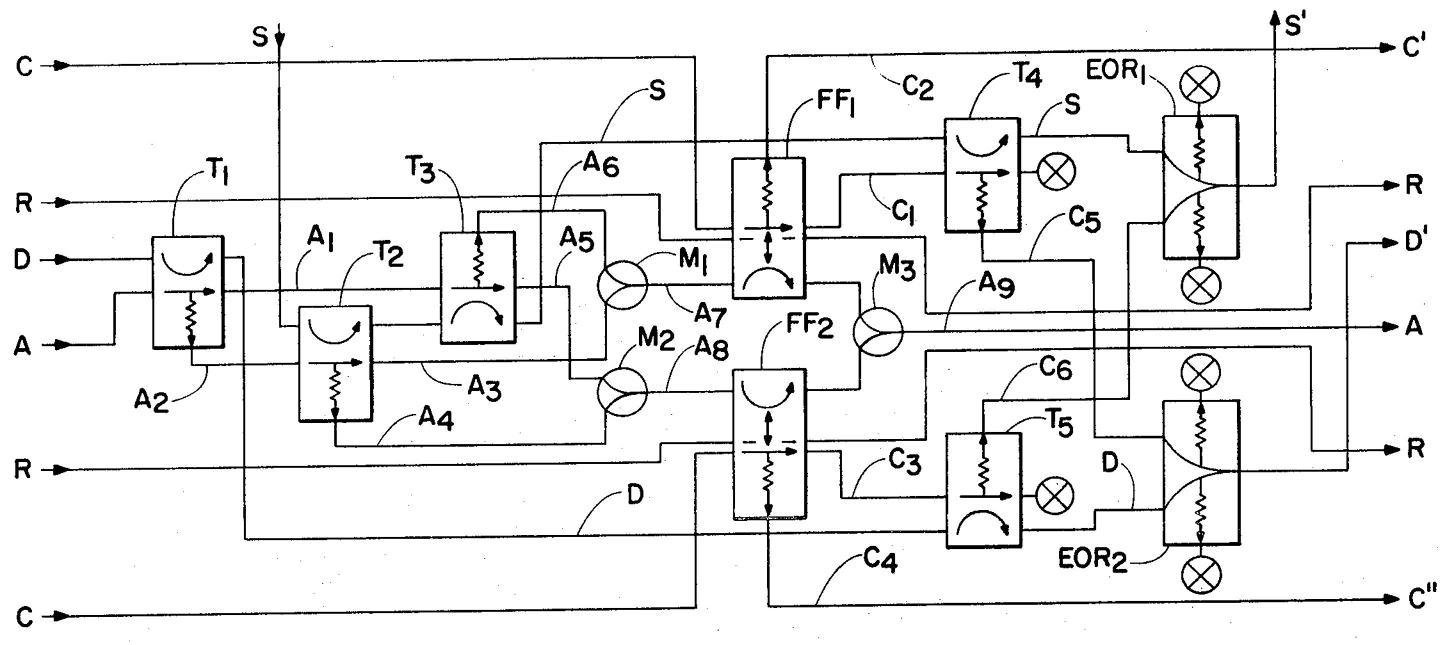
FIG. 2 is a block schematic diagram of one of a plurality of logic circuits contained within the memory arrangement of FIG. 1.
FIG. 3 is an example in binary notation of the operation of the logic circuit illustrated in FIG. 2.

The basic structure of the discrete domain memory arrangement, illustrated in the accompanying FIGS. 1 and 2, is of a conventional type comprising a magnetic wafer having a soft-magnetic overlay which guides the magnetic bubbles along the various paths in response to an oscillating magnetic field. The basic structural details of such a magnetic bubble structure are well known to those skilled in the art, and consequently have not been illustrated in detail.

Referring to FIG. 1, the discrete domain memory arrangement comprises 10 closed propagation loops $S_1$, $S_2$, - - - $S_{10}$, each for sequentially circulating and storing a data word. Associated with the storage loops $S_1$, $S_2$ - - - $S_{10}$ are logic circuits $L_1$, $L_2$- - - $L_{10}$ respectively.

Also included is an interrogation or data path D–D' an address control path A—A, two information control paths C–C' and C–C'' and a reset path R—R. In addition to the control paths, each of the logic circuits $L_1$ - - - $L_{10}$ has a separate storage path S–S' (shown in greater detail in FIG. 2) which forms a part of the associated storage loops $S_1$ - - - $S_{10}$ illustrated in FIG. 1. The data path D–D' provides the information content of the words being entered and retrieved from the memory. The control paths A–A', C–C' or C–C'' define the limits of the address and information sections of the words. In the following examples the address portion is shown at the beginning of each word. It is evident that various other configurations may be used such as the address being dispersed throughout the word. The reset path R—R provides reset information, while the storage path S–S′ stores both the address and information content of one of the words.

Because the information content of the paths A—A and R—R is the same at the respective inputs and outputs of each cell, identical reference characters are used. Conversely, because the information content at the output of the paths D–D′, C–C′, C–C″ and S–S′ may differ from that at their respective inputs, modified reference characters are used. The inputs of each of the paths C, R, D, A and C are fed from bubble generators 10, 11, 12, 13 and 14 respectively. The outputs from each of the paths C′, R, D′, A and C″ are fed to bubble annihilators 20, 21, 22, 23 and 24 respectively. However, before annihilation bubbles in the output path D′ are sensed in a sensor 25. Each of the generators 10 - - - 14 is under the control of a control circuit 30, which also receives information from the sensor 25. The control circuit 30 is of conventional form and provides control for a magnetic field source 31 which in turn controls the propagation of the magnetic bubbles. The circuit 30 also provides the interface with a data processing unit (not shown).

Each of the ten storage loops $S_1$ - - - $S_{10}$ is similar in structure and has a capacity of twelve information bits as indicated by the short lines traversing the exemplary loops $S_5$ and $S_8$. The presence of a bubble, shown as a small circle at some of the storage points, represents a logic 1, while the absence thereof represents a logic 0. Each of the paths C–C′, R—R, D–D′, A—A and C–C″ is serially connected through all the logic circuits $L_1$ - - - $L_{10}$ although for simplicity only the data path D–D′ is shown as actually passing through the cells. Each of the words stored in the 12 bit storage loops $S_1$ - - - $S_{10}$ contains a four bit address interval, a seven bit information portion and a one bit reset interval. The four bit address interval of each word is delineated by a double line which traverses each of the paths. It will be evident that in a practical embodiment, the capacity of the storage loops $S_1$ - - - $S_{10}$ as well as the delay interval between the logic circuits $L_1$ - - - $L_{10}$ may be many times that shown in the example embodiment of FIG. 1. However, the principle of operation remains the same.

FIG. 2 illustrates in greater detail an example of one of the logic circuits $L_1$ - - - $L_{10}$ illustrated in FIG. 1. The following is a brief description of each of the elements used in the circuit.

The circuit includes five transfer gates $T_1$, $T_2$, $T_3$, $T_4$ and $T_5$. Information fed to the transfer gate $T_1$ is derived from the data path D and the address control path A. A magnetic bubble entering the transfer gate $T_1$ on path A will, if undisturbed, pass through and emerge on the address control path $A_1$. However, the simultaneous presence of a magnetic bubble on the path D deflects the bubble on path A down the resistance path so that it emerges on address control path $A_2$. An illustration of a magnetic bubble transfer gate of this type is depicted in greater detail in FIG. 1 of the above-mentioned article by M.R. Garey. Transfer gates $T_2$ - - - $T_5$ are similar in structure and operation to that of transfer gate $T_1$. It will be noted that bubbles emerging from the direct outputs of transfer gates $T_4$ and $T_5$ are annihilated. Consequently, a bubble entering transfer gate $T_4$ on path $C_1$ will only emerge on control path $C_5$ when a bubble is simultaneously present on the storage path S.

Each logic cell also includes three mergers $M_1$, $M_2$ and $M_3$. The overall structure is such that with appropriate delay intervals along the various paths, and the logic performed by the transfer gates $T_1$, $T_2$ and $T_3$, simultaneous arrival of two magnetic bubbles at the mergers $M_1$ - - - $M_3$ is negated.

Each logic circuit also includes a pair of set-reset flip flops $FF_1$ and $FF_2$. The presence of a magnetic bubble on the address control path $A_7$ deflects an idler bubble within the flip flop $FF_1$ (illustrated pictorially in the schematic as a double ended arrow) towards the control path C. The flip flop $FF_1$ is now in a set condition. Thereafter, all bubbles propagating along the control path C will be repelled by the idler bubble in the flip flop $FF_1$ and hence diverted from the control path $C_1$ to the control path $C_2$ until a reset bubble on the reset path R deflects the idler bubble back towards the address control path $A_7$. Operation of the flip flop $FF_2$ is similar to that of the flip flop $FF_1$. FIG. 5 of the above-mentioned article by M.R. Garey illustrates a magnetic bubble set-reset flip flop in greater detail.

Each logic circuit also includes a pair of Exclusive OR gates $EOR_1$ and $EOR_2$. In the Exclusive OR gate $EOR_1$, a magnetic bubble being propagated along either the storage path S or the control path $C_6$ is merged and fed out on the storage path S′. However, where bubbles occur simultaneously on the two paths, they are both deflected in the gate $EOR_1$ into the alternate high resistance paths and thereafter annihilated. Similarly, a bubble is transmitted through the Exclusive OR gate $EOR_2$ to the data path D′ only when a bubble is present on either the input data path D or the control path $C_5$. The simultaneous occurrence of a magnetic bubble on both the paths D and $C_5$ results in no output bubble from the gate $EOR_2$. An example of a magnetic bubble Exclusive OR gate is illustrated in greater detail in FIG. 3 of the above-mentioned article by Sandfort et al.

It will be evident that the control paths C–C′, R—R, D–D′, A—A, R—R and C–C″ of FIG. 2 parallel those of FIG. 1. For simplicity of construction, the reset paths R—R have been duplicated in FIG. 2. It will however be evident that providing the proper delay intervals were utilized a single reset path R—R could be used. As will be apparent from FIG. 1, the inputs to the first logic circuit $L_1$ of both the control paths C are identical because the generators 10 and 14 are controlled by a common source. However, depending upon the logic function within each of the following logic circuits, one of the output control paths C′ or C″ may differ from that of the input C.

The overall structure of the discrete domain memory arrangement and in particular the logic circuit illustrated in FIG. 2, will be better understood when taken in conjunction with the following description of its operation. The three basic logic operations of the mass memory arrangement are: (1) retrieval of specific information in response to a particular address; (2) alteration of the information content of a specific word within the mass memory and (3) alternation of a specific address of one of the unique words within the memory. These various operating modes will be better understood when FIGS. 1 and 2 are taken in conjunction with FIG. 3.

In an information retrieval mode, a specific four-bit address such as logic 1101 is generated by the bubble generator 12 under control of the control circuit 30. The address is then advanced down the *d* data path D sequentially through each of the logic circuits $L_1$ - - -

$L_{10}$ under control of the magnetic field source 31 which generates an oscillating magnetic field. As the address reaches each of the circuits, it is compared on a bit-by-bit basis with the particular address stored in each of the storage loops $S_1$ - - - $S_{10}$. As is evident from FIG. 1, the address interval of each stored word is staggered with respect to the others so that it will coincide with the address interval being advanced down the data path D. When a match is detected between the two addresses in one of the logic circuits, the data stored in the information portion of the associated storage loop is replicated in the data path. In FIG. 1 it can be seen that an address logic 0011 in the data path D–D′ matches that of the storage loop $S_8$. Consequently, the information stored in the storage loop $S_8$ is being replicated by the logic circuit $L_8$ in the data path D–D′. As the word is further advanced along the data path D–D′, it is read out through the sensor 25 back to the control circuit 30 where it can be utilized.

Following the aforementioned word interval, an address of logic 1101 is propagated along the data path D–D′. As it is propagated through each logic circuit, it is compared with the address stored in the associated propagation loop. The address is illustrated just entering the logic circuit $L_5$ where it will be compared on a bit-by-bit basis with the address stored in the storage loop $S_5$. It is evident that a match will be detected in logic circuit $L_5$ whereupon the information portion of the storage loop $S_5$ will be replicated in the information interval of the word being transferred along the data path D–D′. Since each address is made unique to a particular storage loop, a match will be detected in only one of the logic circuits $L_1$ - - - $L_{10}$.

As is evident, the beginning of a word within each of the loops $S_1$ - - - $S_{10}$ is staggered with respect to the others because of the transmission delay along the data path D–D′. This insures that the corresponding logic bits arrive simultaneously at the logic circuits and permits information which is requested in any random order to be fed out from the mass memory arrangement in a continuous data stream. The transmission of control data along the control paths C–C′ R—R, A—A and C–C″ will be better understood by the following examples with specific reference to FIGS. 2 and 3. The following expressions detail the logic functions performed by the various elements of the logic circuit illustrated in FIG. 2. The symbols $F_1$ and $F_2$, which are not shown in FIG. 2, indicate a set state of the flip flops $FF_1$ and $FF_2$ respectively; while the symbols $\bar{F}_1$ and $\bar{F}_2$ indicate a reset state thereof.

LOGIC CIRCUIT FUNCTION

"Boolean Notation"

| | |
|---|---|
| $A_1 = A \cdot \bar{D}$ | $C_1 = \bar{F}_1 \cdot C$ |
| $A_2 = A \cdot D$ | $C_2 = F_1 \cdot C$ |
| $A_3 = A \cdot D \cdot \bar{S}$ | $C_3 = \bar{F}_2 \cdot C$ |
| $A_4 = A \cdot D \cdot S$ | $C_4 = F_2 \cdot C$ |
| $A_5 = \bar{A} \cdot \bar{D} \cdot \bar{S}$ | $C_5 = C_1 \cdot S$ |
| $A_6 = A \cdot \bar{D} \cdot S$ | $C_6 = C_3 \cdot D$ |
| $A_7 = A \cdot \bar{D} \cdot S + A \cdot D \cdot \bar{S}$ | $D^1 = D\ C_5 \oplus$ |
| $A_8 = A \cdot \bar{D} \cdot \bar{S} + A \cdot D \cdot S$ | $S^1 = S\ C_6 \oplus$ |
| $A_9 = A$ | |

In the following examples, a logic 1 represents the presence of a discrete domain or magnetic bubble while a logic 0 represents the absence thereof.

Data Word Retrieval

Word 1 of FIG. 3 is an example of data word retrieval. Logic 1s are propagated along the address control path A during the address portion (bits 1–4) of the word while logic 1s are propagated along the information control path C during the information portion (bits 5–11). At the end of the word (bit 12), a logic 1 is propogated along the reset control path R.

The selected address (in this example logic 1101) is transmitted along the data path D to the transfer gate $T_1$. Due to the simultaneous occurrence of logic 1s in the path A, the address is replicated in the path $A_2$, and the complement of the address is replicated in path $A_1$. These outputs are then steered by the address stored in the path S–S′ through the transfer gates $T_2$ and $T_3$ and then through the mergers $M_1$ and $M_2$ to derive an output on path $A_7$ only when any portion of the address is mismatched, and on $A_8$ only when any portion of the address is matched. Any output from the paths $A_7$ and $A_8$ sets the flip flops $FF_1$ and $FF_2$ respectively as hereinbefore described. As a result, a continuous output during the information portion of the word is obtained on path $C_1$ only if the address is totally matched and on $C_2$ if any portion of the address is mismatched. Conversely, a continuous output during the information portion of the word is obtained on path $C_3$ only if the address is totally mismatched and on $C_4$ when any portion of the address is matched. Consequently, an output will be obtained from both C′ and C″ if the addresses in the data path D and the storage path S partially match or mismatch, from path C′ if they totally mismatch and from path C″ if they totally match.

Since in the present example a total match was obtained, the logic 1s on path $C_1$ will be deflected in transfer gate $T_4$ to path $C_5$ by logic 1s on the storage path S. The information portion of the word is then modulo-2 added in the Exclusive OR gate $EOR_2$ to the information portion of the word on the data path D to provide a combined word ouput on the path D′ which duplicates that in the storage path S–S′.

Since the outputs on the path $A_7$ and $A_8$ are the complements of each other, they will recombine in the merger $M_3$ to again form the address control signal on the path $A_9$. At the end of the word, a single reset magnetic bubble on the reset control path R resets both flip flops $FF_1$ and $FF_2$.

Information Alteration Mode

Word 2 of FIG. 3 is an example of altering the information content of the storage path S–S′. The information content is modified using modulo-2 addition of the information already contained within the storage path S and the information transmitted down the data path D.

As illustrated in word 2, in order to modify the information portion, it is first necessary to transmit the complement of the address stored in the storage path S, down the data path D. Due to a total mismatch between the two addresses, logic 1s are obtained on path $C_3$ during the information portion of the word. This results in a replication of the information on the data path D in the path $C_6$. Modulo-2 addition of the information on the paths S and $C_6$ in the Exclusive OR gate $EOR_1$ results in modified information on the storage path S′.

Address Alteration Mode

If it is also desired to modify the address in a particular storage loop, the complement of the address is transmitted down the data path D as in word 2. However, no reset pulse on path R is transmitted at the end of the word. The logic information in the control paths A and C is then inverted during the address portion of word 3. Modulo-2 addition of the address on the paths S and $C_6$ in the Exclusive OR gate $EOR_1$ results in a modified address on the storage path S'. The example in word 3 also illustrates that matching the bits in the D and S paths, results in the information portion of the word being cancelled from the storage path S'.

It is evident therefore that both address and information data can be read in, altered and read out from any one of the storage loops $S_1$ - - - $S_{10}$ without affecting the information content of the other loops. Such logic functions can be performed sequentially and in continuous order, thereby providing rapid access to a relatively large mass storage system. As in all magnetic bubble manipulations, it is necessary to observe the proper spatial delays along each of the data and control paths in order to provide the correct timing sequence between each of the magnetic bubble streams.

As mentioned above, both the address and information segments of the words being propagated along the data path D–D' are entirely flexible and depend only upon selecting the appropriate signal sequence for the control paths A—A, C–C' and C–C''. It will be evident that address identification must be completed before manipulation of the information content of the word can commence.

In the above-described embodiment, control of the mass memory arrangement is via a number of magnetic bubble paths which are serially connected to each of the logic circuits $L_1$ - - - $L_{10}$. In an alternate embodiment, it would be evident that the logic control can be performed by electrical signals which are individually coupled to each of the logic circuits. In addition, each logic circuit $L_1$ - - - $L_{10}$ may include its own address and information generator which would be directly coupled to the data path D. This would result in concurrent interrogation of each of the storage loops $S_1$ - - - $S_{10}$. Outputs from each of the logic circuits $L_1$ - - - $L_{10}$ would then be combined in a well known manner in a merging tree structure to provide a single data stream output.

Some advantages of simultaneous access are: no propagation delay resulting from sequential interrogation of the cells thereby resulting in faster data access; a simpler procedure for modifying the information content in the storage loops; and, more direct interaction with an external processing and control unit. However, access via propagation registers are described in the foregoing embodiment is employed for complete on-the-chip computation systems, in which conversion from magnetic bubbles to electrical signals and back is avoided for technological and cost reasons.

What is claimed is:

1. A discrete domain memory arrangement comprising:

- a plurality of closed propagation loops each for sequentially circulating and storing a data word having a unique address and an information portion;
- an interrogation path for sequentially propagating data requests therealong having address and information portions coextensive with those contained in said loops;
- means for sequentially generating, in said interrogation path, a plurality of said data requests each having an address matching one of said unique addresses;
- means for periodically advancing the data words and requests along said loops and path respectively;
- means, associated with each loop, for sequentially comparing on a bit-by-bit basis the address within each loop to a specific address of one of said data requests being propagated along the interrogation path; and
- means responsive to the identification of a match between addresses in said comparing means, for replicating the information contained in the associated loop in the information portion of the word in the interrogation path;
- whereby sequential interrogation of a plurality of said loops results in the data words being continuously fed out from the interrogation path in the order requested.

2. A discrete domain memory arrangement comprising:

- a plurality of closed propagation loops each for sequentially circulating and storing a plurality of discrete domains that form a data word having a unique address and an information portion;
- means for sequentially generating a specific address of discrete domains;
- domain logic means, associated with each of said loops, for directly comparing the discrete domains of the address within each loop with that of said specific address;
- said domain logic means including means responsive to the identification of a match between two addresses for replicating the discrete domains of the information portion of the stored data word; and
- means for merging the generated address with the replicated information portion of the stored data word in an output;
- whereby sequential interrogation of a plurality of said loops results in data words being continuously fed out from the path in the order requested.

3. A discrete domain memory arrangement as defined in claim 2 which additionally includes means for sequentially generating an information portion of discrete domains; and

- means responsive to the identification of a complete mismatch between two addresses for adding the generated information portion to that stored in the closed propagation loop;
- whereby the information in the closed propagation loop is modified.

4. A discrete domain memory arrangement comprising:

- a plurality of closed propagation loops each for storing a data word;
- means for generating an address unique to an address of the data word stored in one of said propagation loops; and
- logic means associated with each loop, for identifying a match between the address from said generating means and the address stored in said one loop, and in response thereto for replicating at an output, an information portion of the data word in said one loop;
- whereby sequential interrogation of said closed propagation loops results in data words being continuously fed out in the order requested.

* * * * *